Figure 1:
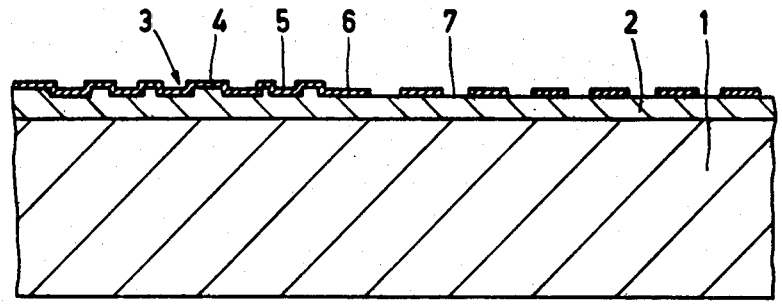

United States Patent [19]

Broer et al.

[11] Patent Number: 4,492,967
[45] Date of Patent: Jan. 8, 1985

[54] OPTICAL RECORDING DISC

[75] Inventors: Dirk J. Broer; Adriaan W. De Poorter, both of Eindhoven, Netherlands

[73] Assignee: U.S. Philips Corporation, New York, N.Y.

[21] Appl. No.: 456,878

[22] Filed: Jan. 10, 1983

[30] Foreign Application Priority Data

Nov. 5, 1982 [NL] Netherlands ............ 8204292

[51] Int. Cl.³ .............................. G01D 15/34
[52] U.S. Cl. .............................. 346/135.1; 346/76 L; 428/690; 430/945
[58] Field of Search .............. 346/76 L, 135.1; 430/945; 428/690

[56] References Cited

U.S. PATENT DOCUMENTS 4,060,032  11/1977  Evans .......................... 346/76 L X
4,230,939  10/1980  de Bont ....................... 346/76 L X
4,405,706  9/1983   Takahashi ..................... 430/945 X Primary Examiner—Joseph W. Hartary
Attorney, Agent, or Firm—Norman N. Spain

[57] ABSTRACT

Optical recording disc having a supporting plate of synthetic resin or being coated with a layer of synthetic resin, an ablative recording layer on the synthetic resin or the layer of synthetic resin and a phosphorus derivative having at least one organic radical in the interface of the synthetic resin or layer of synthetic resin on the side of the recording layer.

5 Claims, 2 Drawing Figures

OPTICAL RECORDING DISC

The invention relates to an optical recording disc in which information can be written and read optically and which comprises a substrate plate which on at least one side is manufactured from a synthetic resin or is provided with a coating layer of a synthetic resin as well as an ablative recording layer provided on the synthetic resin or the layer of synthetic resin.

Such a recording disc is known from and disclosed in, for example, published Netherlands patent application No. 8,005,693 (PHN 9861) in the name of Applicants.

An ablative recording layer is to be understood to mean a layer in which holes or recesses are formed by exposure to energy-rich light, for example laser light, which is modulated in accordance with the information to be recorded. Upon recording information, the disc is rotated at a speed of approximately 150–1800 rpm and is exposed to pulsated laser light which is focused on the recording layer. The pulse time is low and is, for example, from $10^{-6}$ to $10^{-8}$ seconds, for example $5 \times 10^{-7}$ seconds. The power of the laser used is also small and by way of example has a value of 1–20 mW on the disc. As a result of the exposure to pulsated laser light, the recording layer melts in the exposed places. In the melted areas formed the recording layer retracts in the form of a rim under the influence of differences in surface energy, a hole or recess having a thickened rim portion being formed. The information bits thus obtained have small diametrical dimensions in the order of magnitude of 0.5–2 $\mu$m. The thickness of the recording layer is usually 15–50 nm. Examples of useful materials for a recording layer are metals, for example Bi, Al, dyes, dye-containing synthetic resins and in particular chalcogenides, in particular alloys containing tellurium and/or selenium.

The written information is read by means of laser light which is considerably weaker than the writing laser light and, for example, is a factor 10 less rich in energy. The detection of the information bits is based on the changed reflection or transmission of the recording layer at the area of the recesses or holes (bits). The advantage of reading in reflection is that the forward and reflected laser light beams cover the same optical path for the greater part so that fewer optical elements, for example, objectives, will suffice in the writing and reading apparatus. The laser light beam is focused on the recording layer, preferably via the substrate plate, both for writing and for reading. In that case the dust particles, scratches and the like present on the surface of the substrate plate fall beyond the depth of focus on the objective which focuses the laser light, so that surface impurities have no detrimental influence on the quality of the recorded and read information. In that case the substrate plate must be transparent with respect to the laser light used and be manufactured, for example, from a transparent synthetic resin, for example, polycarbonate, polyvinylchloride or polymethylmetacrylate. The substrate plate may also be manufactured from glass, in which a coating layer of a transparent synthetic resin is present between the substrate plate and the recording layer. Of course, a substrate plate manufactured from a synthetic resin may be provided on the side of the recording layer with a separate coating layer of a synthetic resin. A suitable coating layer is a layer of a radiation-cured lacquer, for example a lacquer comprising oligomeric acrylates. The synthetic resin surface adjoining the recording layer may comprise an optically readable information track. The information track is in the form of a spiral or is built up from concentric circles and comprises information areas which are situated at a higher level and at a lower level and which are read in reflection via the transparent substrate plate by means of laser light. The detection of the information areas is based on phase differences between the forward and reflected layer light beams. The difference in level between the areas is a quarter wavelength of the laser light with which reading is carried out, for example, 0.10 to 0.15 $\mu$m. The longitudinal dimensions of the information areas vary in accordance with the information stored and amount to approximately 0.2 to 3 $\mu$m. The stored information comprises, for example, data for the control of the laser light beam with which information is recorded, for example, data as regards the velocity and place of recording.

It is stated in the above-mentioned Netherlands Patent Application that the composition of the recording layer is of essential importance to obtain good results, for example, stability of the layer, sensitivity to laser light and bit definition.

The present invention provides a recording disc with which a considerable increase of the sensitivity of the recording layer to laser light is achieved.

More in particular the invention relates to a recording disc of the type mentioned in the opening paragraph which is characterized in that the interface of the layer of synthetic resin on the side of the recording layer comprises a derivative of phosphoric acid, phosphonic acid, polyphosphoric acid, polyphosphonic acid or an anhydride of the above-mentioned acids, the derivative comprising at least one organic radical, or mixtures thereof.

Good results are obtained in particular by using a derivative which satisfies one of the following formulae:

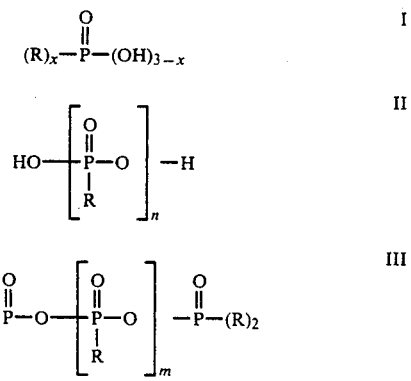

wherein
R is an alkyl group or an alkoxy group having 1 to 18 carbon atoms which may be ethoxylated,
x has the value 1 or 2,
n has the value 2–10, and
m has the value 0–10.

Examples of suitable derivatives are methylphosphate, dimethylphosphate, monobutylphosphate, dibutylphosphate, hexylphosphate, mono-octylphosphate, di-octylphosphate, lauryltriethyleneglycolphosphate, the anhydride or mixed anhydride of the above-mentioned phosphates, n-amylphosphoric acid, n-octylphosphonic acid, the anhydride or mixed anhydride of n-amylphosphonic acid and n-octylphosphonic acid, the anhydride of a mixture of 80 mol.% mono-hexylphosphate and 20 mol.% dihexylphosphate (formula III wherein $R=-OC_6H_{13}$ and $m=6$), the anhydride of a mixture of 50 mol.% mono-methylphosphate and 50 mol.% of mono-pentadecanephosphate (formula II wherein $R=-OCH_3$ and $-OC_{15}H_{31}$ and $n=2-10$, dependent on the extent of dehydratation), anhydride of a mixture of 50 mol.% n-octylphosphonic acid and 50 mol.% of n-hexylphosphonic acid (formula II wherein $R=-C_6H_{13}$ and $-C_8H_{17}$ and $n=2-10$, dependent upon the extent of dehydratation) and the anhydride of methylphosphate and 2-diethylpentylphosphate.

In preparing the anhydrides as described above a mixture of the composing phosphates or phosphonic acids is dehydrated. The resulting product is not a single chemical compound but a composite of various anhydrides the gross composition of which is stated above. The starting product, phosphate or phosphonic acid, also usually is a mixed product. For example, monobutylphosphate obtained by esterifying phosphoric acid with butanol, comprises molecules having no, one or two butoxy groups. On an average each molecule comprises one butoxy group.

The optical recording disc according to the invention can be manufactured by adding the above-mentioned derivative to the material of synthetic resin from which the substrate plate or the coating layer is manufactured, then manufacturing the substrate or the coating layer by means of known methods, and providing a recording layer on the substrate surface or the surface of the coating layer.

By way of example, a substrate plate can be manufactured according to an injection moulding process or a compression moulding process. For this purpose, the mixture of synthetic resin and derivative is compressed at elevated temperature and pressure in a mould which, for the case in which the substrate plate is to be provided with an information track, as described above, comprises one or two matrices which have an information track which is the negative of the desired information track. After removing the pressure and after cooling, a substrate plate is obtained which in addition to the synthetic resin, for example, polymethylmethacrylate, also comprises the above-mentioned derivative. A recording layer is provided on one surface or on both surfaces of the substrate plate.

The recording disc according to the invention can also be manufactured by providing a disc-shaped substrate plate of glass or synthetic resin on one or both sides with a liquid lacquer in a layer thickness of, for example, 30 μm, which can be cured by radiation, for example, by ultra-violet light. The lacquer preferably comprises acrylate monomers which can be cured by radiation, that is to say can be polymerized. The derivative as defined above is added to the lacquer. The lacquer is then cured by radiation and provided with the recording layer. A recording disc according to the invention in which the coating layer comprises an information track is manufactured by providing the liquid radiation-curable lacquer to which the derivative has been added on the surface of a matrix which comprises a negative of the information track. The substrate plate of glass or, if desired, of synthetic resin, is placed on the lacquer layer, the lacquer is cured via the substrate plate by radiation, for example ultra-violet light, and the substrate plate with the cured lacquer layer connected thereto in which the information track of the matrix is copied, is removed from the matrix. Finally a recording layer is provided on the cured lacquer layer by using, for example, a vapour-deposition process for a sputtering process.

The quantity of derivative in the substrate plate and-/or the coating layer is not restricted to narrow limits. A quantity of 0.5% by weight calculated on the synthetic resin already gives a significant increase of the sensitivity of the recording layer to laser light. As a rule at most 5% by weight is used. As a result of diffusion and under the influence of surface energy the concentration of the derivative at the surface of the substrate plate or of the coating layer will be or become slightly larger than in the other parts.

The number of carbon atoms in the organic radical of the derivative depends on the type of synthetic resin which is used in the substrate plate or in the coating layer. The derivative must be miscible with the synthetic resin. In the case of an apolar synthetic resin, for example polyethylene, the derivative preferably must also be apolar as much as possible and hence comprise a comparatively long apolar organic radical, for example a long alkyl radical. The long apolar organic radical screens the polar phosphoric acid group. When a more polar synthetic resin, for example an acrylate or methacrylate synthetic resin, is used the organic radical of the derivative may be more polar and comprise, for example, a short alkoxy group.

The invention will be described in greater detail with reference to the embodiment and the drawing, in which FIG. 1 is a cross-sectional view of an optical recording disc according to the invention.

Figure 2:
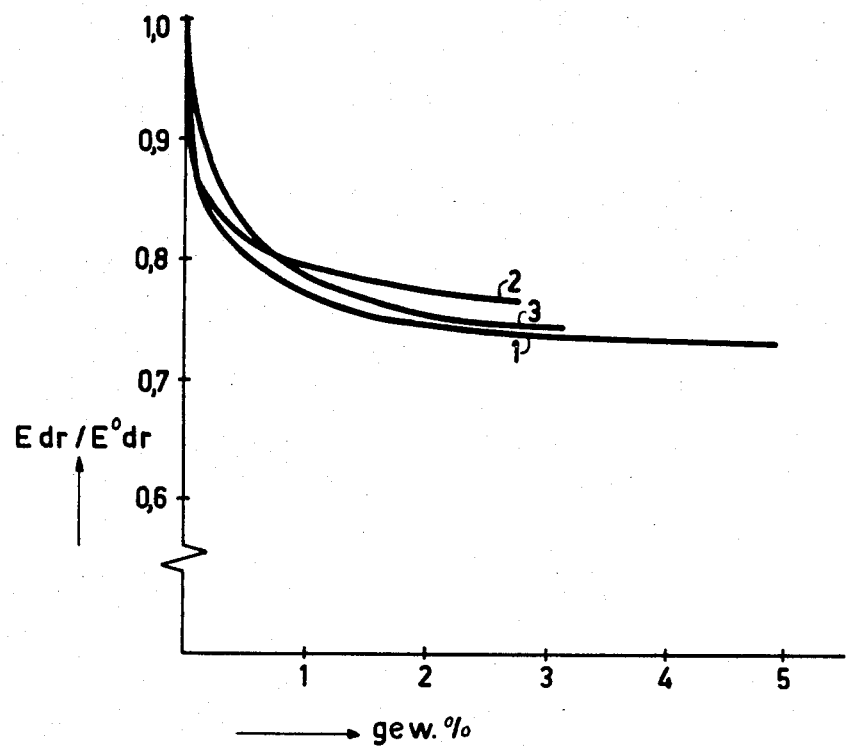

FIG. 2 is a graph showing the relationship between the quantity of added derivative and the relative threshold sensitivity of the recording layer.

EXAMPLE

A substrate plate (1) of polymethylmethacrylate having a diameter of 30 cm and a thickness of 1.3 mm is provided on one side with a light-cured lacquer layer (2) having a thickness of 30 μm. Lacquer layer 2 comprises an optically readable information track 3 of areas 4 situated at a higher level and areas 5 situated at a lower level. Lacquer layer 2 comprises a recording layer 6 having a thickness of 30 nm. The lacquer layer comprises the derivative as described above in a quantity of 0.5% by weight. The derivative used is recorded in column 1 of Table 1. The lacquer composition and the composition of the recording layer are recorded in columns 2 and 3 of Table 1 and are explained in Tables 2 and 3.

The information track 3 comprises information with respect to the recording of data, for example, information regarding the speed and place of recording. The information track is ready by means of laser light on the basis of phase differences between the forward and reflected laser light beam. The laser light is focused on the information track via the substrate plate 1. The difference height of the areas 4 and 5 is $\lambda/4d$ where $\lambda$ is the wavelength of the reading laser light and d is the refractive index of the substrate.

The difference in height is usually 0.11 μm. The longitudinal dimensions of the areas 4 and 5 vary in accordance with the stored information and are 0.2–3 μm.

For the recording of data the recording layer 6 is exposed to laser light which is approximately a factor 10 energy-richer than the beam with which the information track is scanned. The recording laser light is focused on the recording layer via the substrate plate 1 and is pulsated in accordance with the binary data to be recorded. The pulse time is 60 ns. As a result of the exposure to the pulsated laser light, holes (7) are formed in the recording layer 6.

In a test series with the above-described recording discs the threshold sensitivity of the recording layer was determined. The threshold sensitivity is the minimum quantity of laser light energy ($E_{dr}$) necessary to form a hole (bit) in the recording layer in at least 99.9% of the exposed places. In a second test series the threshold sensitivity ($E°dr$) is determined of recording discs which differ from the above-described discs in that the lacquer layer does not comprise the derivative. The ratio of the threshold sensitivity with and without the derivative ($Edr/E°dr$) is recorded in column 4 of Table 1. As a result of this, smaller holes can be made in the recording layer 6 and consequently the information density is higher. Of course, less energy is also necessary to record the data.

TABLE 1

| Derivative 0.5 wt. % | Lacquer Ref. No. | Recording Layer Ref. No. | Threshold sensitivity Edr/E° dr |
|---|---|---|---|
| monobutylphosphate | L-1 | T-1 | 0.8 |
| monobutylphosphate | L-1 | T-2 | 0.8 |
| monobutylphosphate | L-1 | T-3 | 0.7 |
| dibutylphosphate | L-1 | T-2 | 0.9 |
| dibutylphosphate | L-1 | T-3 | 0.8 |
| mixture of mono- and dioctylphosphate | L-1 | T-1 | 0.8 |
| lauryltriethyleneglycolphosphate | L-1 | T-1 | 0.8 |
| n-amylphosphonic acid | L-1 | T-1 | 0.8 |
| n-octylphosphonic acid | L-1 | T-1 | 0.8 |
| mixed anhydride of methylphosphate and 2-diethyl-pentyl-phosphate | L-1 | T-4 | 0.8 |
| mixed anhydride of methylphosphate and 2-diethyl-pentyl-phosphate | L-1 | T-1 | 0.8 |
| mixed anhydride of methylphosphate and 2-diethyl-pentyl-phosphate | L-1 | T-2 | 0.8 |
| mixed anhydride of methylphosphate and 2-diethyl-pentyl-phosphate | L-1 | T-3 | 0.8 |
| mixed anhydride of methylphosphate and 2-diethyl-pentyl-phosphate | L-2 | T-5 | 0.7 |
| mixed anhydride of methylphosphate and 2-diethyl-pentyl-phosphate | L-2 | T-2 | 0.8 |
| mixed anhydride of methylphosphate and 2-diethyl-pentyl-phosphate | L-2 | T-3 | 0.8 |
| mixed anhydride of methylphosphate and 2-diethyl-pentyl-phosphate | L-3 | T-2 | 0.8 |

TABLE 2

| | Composition lacquer in wt. % | | |
|---|---|---|---|
| | | lacq. ref. No. | |
| lacquer component | L-1 | L-2 | L-3 |
| tripropyleneglycoldiacrylate | 57 | 62 | |

TABLE 2-continued

| | Composition lacquer in wt. % | | |
|---|---|---|---|
| | | lacq. ref. No. | |
| lacquer component | L-1 | L-2 | L-3 |
| trimethylolpropanetriacrylate | 10 | 17 | |
| N—vinylpyrrolidone | 29 | 17 | |
| hexanedioldiacrylate | | | 96 |
| benzyldimethylketal (initiator) | 4 | 4 | 4 |

TABLE 3

| | Composition of recording layer in wt. % | | | | |
|---|---|---|---|---|---|
| | recording layer ref. No. | | | | |
| component | $T_1$ | $T_2$ | $T_3$ | $T_4$ | $T_5$ |
| Te | 60 | 75 | 83 | 86 | 88 |
| Se | 25 | 15 | 12 | 11 | 10 |
| Sb | 10 | 5 | 3 | 1.5 | 1 |
| S | 5 | 5 | 2 | 1.5 | 1 |

In FIG. 2 the relative threshold sensitivity $Edr/E°dr$ is plotted on the vertical axis as a function of the quantity by weight of derivative present in the lacquer, expressed in % by weight. Curve 1 in FIG. 2 relates to an information disc having the lacquer layer L-1, the recording layer T-4 and the mixed anhydride recorded in Table 1, curve 2 in FIG. 2 relates to the lacquer layer L-1, the recording layer T-1 and the mixed anhydride recorded in Table 1, curve 3 in FIG. 2 relates to a disc having lacquer layer L-1, recording layer T-1 and the derivative monobutylphosphate.

What is claimed is:

1. In an optical recording disc in which information can be written and read optically comprising a substrate having a synthetic resin surface and an ablative recording layer situated on said synthetic resin surface, the improvement wherein said synthetic resin surface comprises an organic phosphorous compound of the formula:

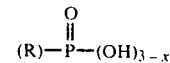

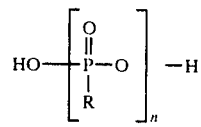

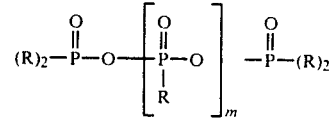

wherein
R is an alkyl group or an alkoxy group having 1 to 18 carbon atoms which may be ethoxylated,
X has the value 1 or 2,
N has the value 2–10, and
M has the value 0–10.

2. The recording disc of claim 1 wherein from about 0.5%–5% by weight of the phosphorous compound is present in said synthetic resin surface.

3. The recording disc of claim 2 wherein the substrate is formed of a synthetic resin.

4. The recording disc of claim 3 wherein the substrate is transparent.

5. The recording disc of claim 2 wherein the substrate is formed of glass and the synthetic resin surface is formed of a transparent synthetic resin layer.

* * * * *